(No Model.) 4 Sheets—Sheet 1.
R. T. ROBERTS.
POTATO DIGGER.
No. 336,667. Patented Feb. 23, 1886.
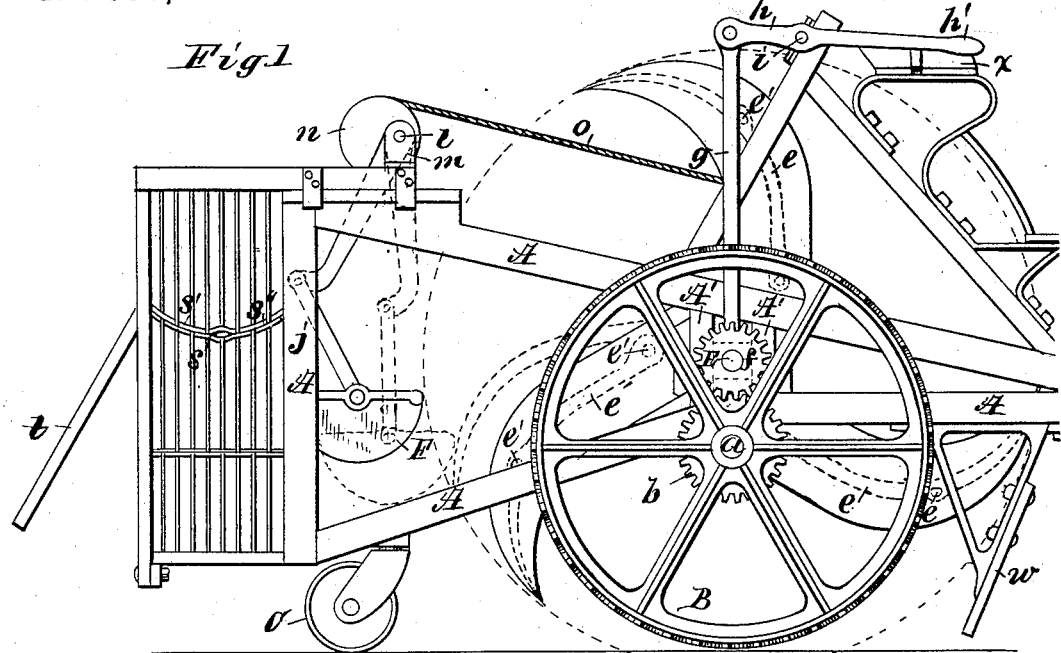
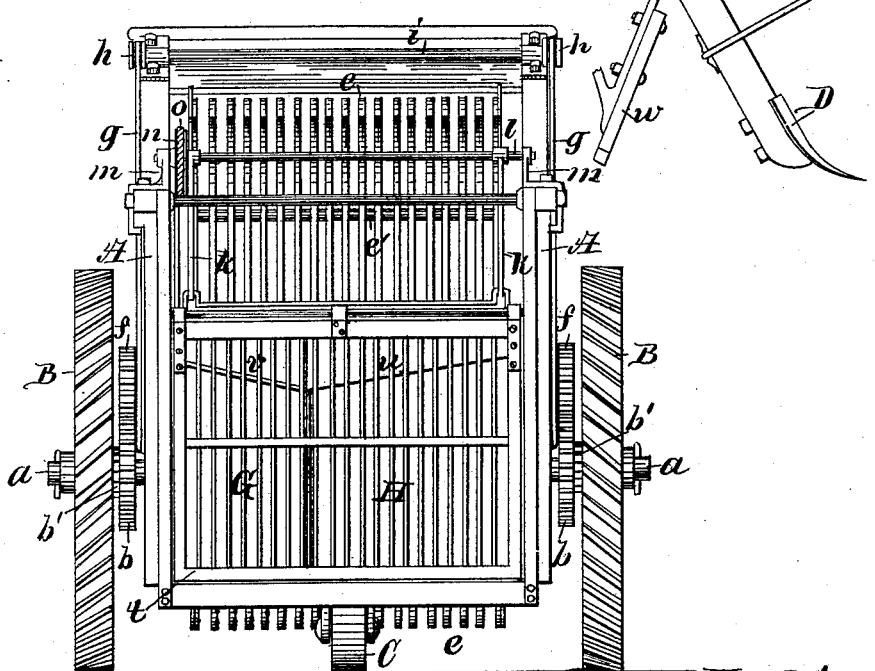

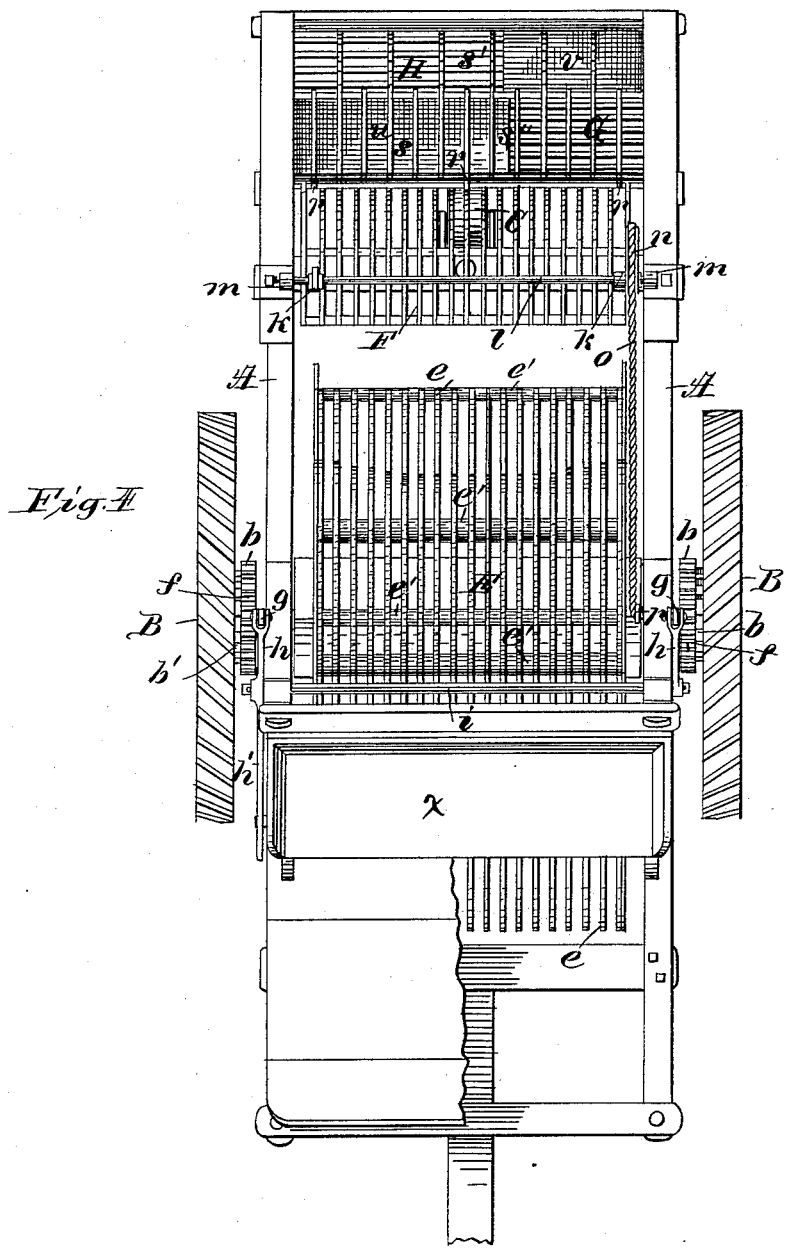

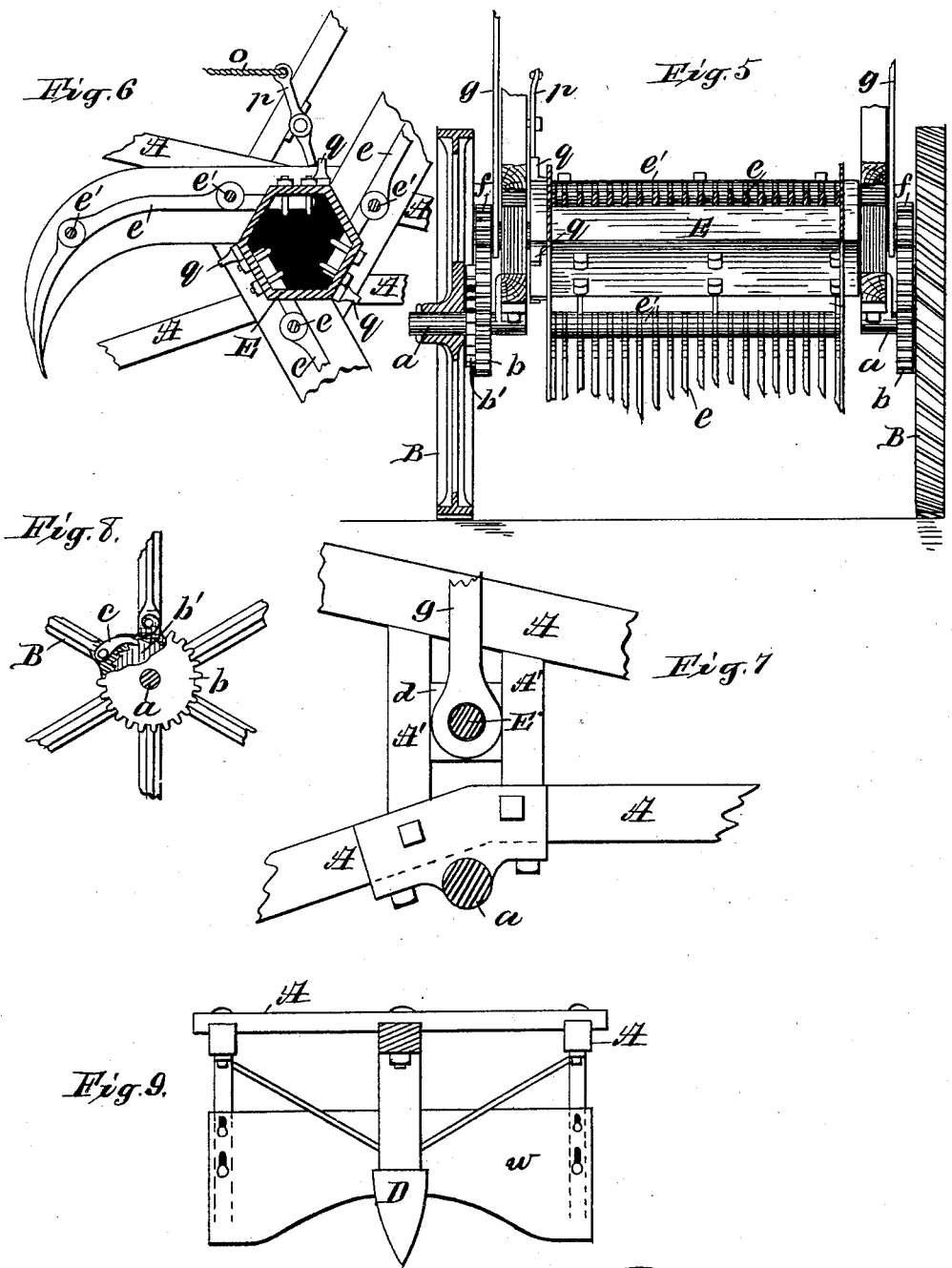

(No Model.) 4 Sheets—Sheet 4.

R. T. ROBERTS.
POTATO DIGGER.

No. 336,667. Patented Feb. 23, 1886.

Witnesses
G. M. Gridley
M. J. Schirmer

Inventor
Robert T. Roberts
By Ermin & Benedict
Attorneys.

UNITED STATES PATENT OFFICE.

ROBERT THOMAS ROBERTS, OF RACINE, WISCONSIN.

POTATO-DIGGER.

SPECIFICATION forming part of Letters Patent No. 336,667, dated February 23, 1886.

Application filed June 25, 1885. Serial No. 169,717. (No model.)

*To all whom it may concern:*

Be it known that I, ROBERT T. ROBERTS, of Racine, in the county of Racine and State of Wisconsin, have invented new and useful Improvements in Potato-Diggers; and I do hereby declare the following to be a full, clear, and exact description of said invention, reference being had to the accompanying drawings, and to the letters or figures of reference marked thereon, which form a part of this specification.

My invention, to be hereinafter distinctly claimed, relates to potato-diggers.

The object of the invention and the operation of the device will be understood from the following description, with a reference to the accompanying drawings, in which—

Figure 10:
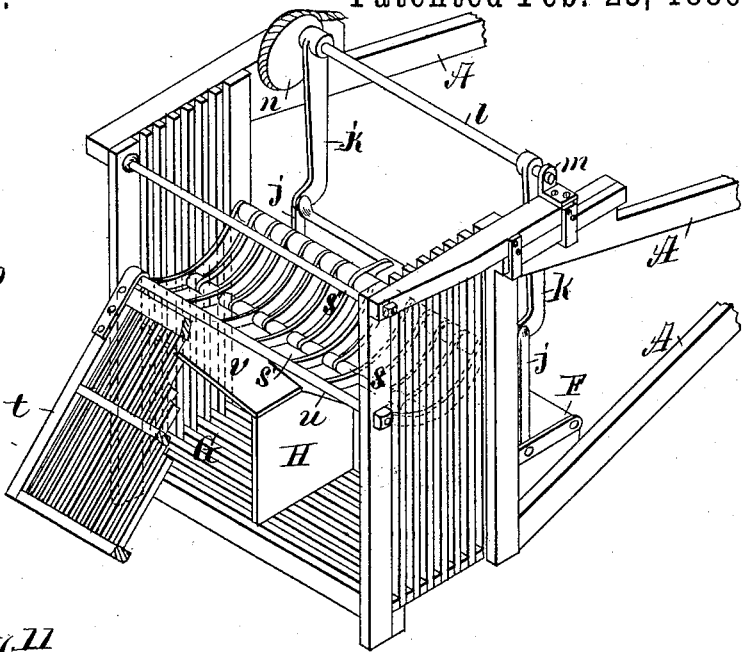
Figure 11:
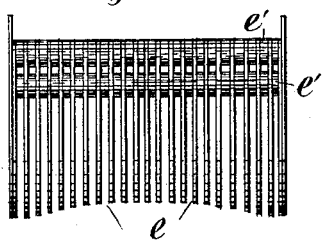
Figure 12:
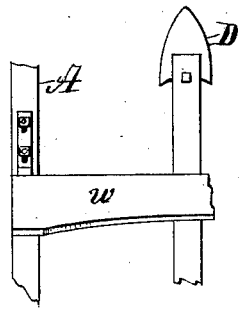

Figures 1 and 2 are side views of my device, Fig. 2 being a view of the prolongation of Fig. 1. Fig. 3 is a rear view. Fig. 4 is a top view, a part of the inclosing-case and step in front of the driver's seat being broken away, showing interior parts. Fig. 5 is a rear view of the teeth-holding shaft and some cooperative and adjacent parts partly in section. Fig. 6 is a cross-section of the shaft shown in Fig. 5, showing the method of attaching the fingers to the shaft. Figs. 7 and 8 are details. Fig. 9 is a front view of the part shown in Fig. 2. Fig. 10 is a perspective view of the potato-boxes at the rear part of the machine, parts being omitted to show other parts more fully. Figs. 11 and 12 are details.

The same letters refer to like parts in all the views.

The frame A, which supports the operative mechanism, is in turn supported and carried on the wheels B B and the swiveled caster-wheel C. Attached to the frame in front of the other mechanism is the shovel-plow D, which is adapted to run in and loosen up the soil and potatoes in the row preparatory to the work of the other mechanism. The wheels B B are each provided with a short axle, $a$, rigid to the frame A. On each of these axles there is a toothed wheel, $b$, which is provided with a rigid smaller ratchet-wheel, $b'$, in the teeth of which ratchet-wheel a pawl, $c$, pivoted on the wheel B, engages and compels the wheel $b$ to rotate with the wheel B when it rotates forwardly and permits the wheel $b$ to remain at rest when the wheel B rotates rearwardly. The peripheries of the wheels B B are provided with diagonal friction projections, to prevent slipping on the ground. A shaft, E, (preferably constructed of hexagonal form for convenience of attaching the fingers thereto,) is supported and has its journal-bearings in the blocks $d\ d$, which blocks are supported and have a vertical movement in the upright posts A' A', which posts are rigid to and a part of the frame A, said movable axle-bearing blocks providing the requisite movement for raising the shaft E out of gear when desired. The shaft E carries three or more parallel rows or series of fingers, $e\ e\ e$, which fingers are in each series held together in position by one or more rigid cross rods, $e'\ e'$. Three of these fingers project rearwardly of the rear cross-head, and the ends thereof are inserted in apertures therefor in the shaft E, and are retained therein by stirrups, as shown in Fig. 6. These fingers are attached in horizontal rows, as aforesaid, the entire length of the shaft E inside of the frame A, said fingers extending outwardly at right angles from said shaft, and being at their outer ends curved inwardly, as shown in Figs. 1 and 6. The outer fingers on both ends of each row are preferably made somewhat longer than the central ones, as shown in Fig. 11, being thereby better adapted for gathering and retaining potatoes when taken from rows or hills.

The series of fingers $e\ e\ e$ are adjustable farther in or out on the shaft E by loosening the stirrups that clasp the rearwardly-projecting fingers in the shaft E, and drawing out or pushing in the fingers, whereby when so adjusted in or out they will rotate through a less or greater arc, as desired.

To adapt other parts of the mechanism to such less or greater radial length of the fingers $e\ e$, the fender $w$ and the boxes G and H are also made adjustable on the frame forward or back, as required.

The fender W and the arms on which it is supported are adjustable forward or back on the frame A by means of the slots in said arms and the bolts therethrough, by which they are attached to the frame, as shown in Fig. 12, and the boxes G and H are adjustable in or out by means of the upper supporting-beams of these boxes sliding on the frame A, and secured thereto by stirrups or clasps with bolts or screws, as shown in Fig. 10.

On each of the outer ends of the shaft E and rigid thereto is the toothed wheel $f$, directly over and meshing with the wheel $b$, and by and through which wheels when in mesh the shaft E is caused to rotate by and in an opposite direction to the rotation of the wheels B B when the machine is drawn forward.

To raise the shaft E so that the wheels $f$ and $b$ will not mesh, and thereby permit the machine to be hauled over the road from one locality to another without operating the other mechanism, I provide on each side a rod, $g$, terminating at its lower end in a sleeve around shaft E, and at its upper end pivoted to the lever $h$, which is pivoted on frame A. One of these levers terminates in the handle $h'$. The levers $h$ $h$ are both rigid on the axle on which they are pivoted, so that by depressing the handle $h'$ the operative mechanism of the device may be thrown out of gear with the wheels B B.

In the rear of the rotating fingers $e$ $e$ is suspended a cage or basket, F, which basket is as long as the rows of fingers $e$ $e$, and is provided with a grated bottom, and is supported at each end by a rod, $j$, attached thereto and extending upwardly therefrom, and pivoted at its upper end onto the outer end of an arm, $k$, which arm $k$ is at its other extremity rigid on an axle, $l$, supported and rotating in lugs $m$ $m$, rigid on frame A.

Rigid on the axle $l$ is the segmental arm $n$, having a groove in its periphery, in which groove runs a cord, $o$, attached at one end to said arm $n$, and at the other end attached to one end of a lever, $p$, Fig. 6, which lever is centrally pivoted on the frame A, and at the other end impinges against the studs $q$ $q$, rigid on the shaft E, and corresponding in number with the rows of fingers on said shaft. The adjustment of which studs and the mechanism operating said basket is such that the basket is down close against one series of fingers as the others arrive at the top and pass over to the rear, so that the load of potatoes on the fingers will be discharged into the basket, and thereupon the basket will begin to be raised, as shown in Fig. 1, and when raised sufficiently the outer edge of the basket strikes against and is tripped by a projecting lug, $r$, at the inner edge of the screen $s$, and the basket by the continued raising of the arm $k$ is upset and its contents are discharged onto the screen $s$, and the basket again falls by gravity into position to receive the load on the succeeding series of fingers as they rotate into position to discharge their contents. The screen $s$ is rigid over the top of two grated boxes, G and H, one at either side of the machine at the rear part, which are both closed by the outwardly-opening grated door $t$.

The screen $s$ has two sizes of meshes, in the inner one of which, $s''$, the meshes are smaller, and permit only small potatoes to pass through, which drop directly into the box G, underneath a part of it, or are carried into the box G by the inclined trough $u$, which is underneath that part of the smaller meshed screen which is over the box H, and the outer one, which has large meshes $s'$, which allow the larger potatoes to pass through, dropping directly into the box H underneath a part of it or into the inclined trough $v$, underneath that part of the larger meshed screen which is over the box G, by which inclined trough $v$ the larger potatoes are led into their proper box H.

The potatoes may be removed from both boxes through the opening closed by door $t$.

In the rear of the plow D, and in front of the fingers $e$ $e$ $e$, there is placed a guard or fender, $w$, to ward off and throw aside weeds, stalks, and masses of earth or other otherwise obstructing material.

On the frame in front is placed a seat, $x$, for the driver.

From the foregoing description the operation of this device will be apparent to any farmer or person skilled in the mechanic arts.

What I claim as new, and desire to secure by Letters Patent, is—

1. The series of fingers $e$ $e$ $e$, affixed to and rotating with a horizontal shaft, E, actuated by the revolving of the machine supporting and carrying wheels B B, in combination with the basket F, suspended on arms $k$ $k$, rigid on axle $l$, said axle $l$ being provided with mechanism connected to axle E, whereby when said axle E rotates said basket F is raised and lowered, all being supported on the frame A, and all substantially as described.

2. In a potato-digging machine, a horizontal rotating axle, E, provided with one or more series of fingers, $e$ $e$ $e$, in combination with a rising and falling basket, F, actuated by mechanism connecting it with the axle E, and a potato-receptacle, G and H, all supported on a frame, A, and all constructed and operating substantially as described.

3. In a potato-digging machine, the finger-carrying axle E, provided with series of fingers $e$ $e$ $e$, and attached to mechanism whereby it is rotated, in combination with the basket F, suspended on arms $k$, rigid on axle $l$, axle $l$, supported and rotating in frame A, segmental lever $n$, rigid on axle $l$, cord $o$, attached at one end to segmental lever $n$ and at the other end to lever $p$, lever $p$, pivoted on frame A, and studs $q$ $q$, rigid on axle E, all substantially as and for the purpose set forth.

4. In a potato-digging machine, the suspended rising and falling basket F, in combination with the screen $s$, and the potato-receiving boxes H and G, all supported on frame A, and all substantially as and for the purpose set forth.

In testimony whereof I affix my signature in presence of two witnesses.

ROBERT THOMAS ROBERTS.

Witnesses:
L. T. ROBERTS,
E. O. HAND.